UNITED STATES PATENT OFFICE.

PRESLEY E. COMEGYS, OF CHICAGO, ILLINOIS.

METHOD OF MAKING SAUSAGE-CASINGS.

1,260,755. Specification of Letters Patent. Patented Mar. 26, 1918.

No Drawing. Application filed November 27, 1916. Serial No. 133,776.

*To all whom it may concern:*

Be it known that PRESLEY E. COMEGYS, a citizen of the United States, residing at Chicago, in the county of Cook and State of Illinois, has invented certain new and useful Improvements in Methods of Making Sausage-Casings, of which the following is a specification.

My invention relates to an improved method of making sausage casings, the object being to provide a method by which animal intestines may be so treated that they may be cut up into various sizes suitable for the purposes, and the edges stitched together.

The invention consists, therefore, in the process hereinafter described and set forth in the claims. I first take the intestines which have previously been cured and soak them in water until they are rendered soft and pliable and free largely from saline substances. I then relieve the intestines from surplus fatty substances by proper scraping. I then pass them over and upon a cutting pole, the latter being provided with a groove extending in a straight line lengthwise thereof. Said groove being of width sufficient only to accommodate the passage of a knife blade therethrough. The intestines thus supported are cut lengthwise by passing the cutting knife through the length of the cutting pole.

I then spread the intestines in a similar manner in which hides are spread for treatment and cover each with salt. I then lay the intestines thus treated in piles, one intestine upon another and allow them to drain for a considerable period of time, say overnight or until the excess of moisture has drained off and the intestines have attained the firmness I desire. I then suspend independently in a suitable manner to facilitate drying and when they are sufficiently dried, each intestine is brushed thoroughly either by hand or a machine suitable for the work until the surplus of salt has been removed.

I then spread out each intestine separately to their full width and roll them with a suitable roller to render them as smooth as possible. I then arrange them in pairs by placing one intestine upon another with the insides thereof in contact. The edges of the intestines may be sewed while so arranged in pairs and without cutting the edges thereof or, if desired, the edges may be cut while arranged thus in pairs and thereafter sewed.

However, in either case this completes the method of treating the intestine members to fit them for use in compliance with requirement of Federal food laws.

What I claim is:

1. The herein described method of making sausage casings consisting in taking cured casings and soaking them in water, scraping, cutting, spreading, stacking in piles and permitting them to drain for a considerable period, suspending independently for drying, brushing, then spreading and rolling the casings separately, then arranging the casings in pairs with inner sides in contact, trimming the edges and then sewing.

2. The herein described method of making sausage casings consisting of treating previously cured casings by soaking until rendered soft and pliable and rendered substantially free from saline substances, cutting the casings to form suitable expansible sections having substantially straight edges, spreading the sections, then laying them in piles and permitting them to drain for a considerable length of time, then suspending casings separately and permitting them to dry, then spreading to make smooth, then arranging sections in pairs with insides thereof in contact, trimming the edges of said pairs of sections and then sewing the edges together.

3. The herein described method of making sausage casings comprising first treating cured casings until rendered soft and pliable and substantially free from saline substances, slitting the casings and drying each casing separately, arranging the casing sections in pairs with the inner surfaces in contact and sewing the edges together.

4. The herein described method of making sausage casings comprising slitting cured, cleaned casing sections, spreading them open and drying each section separately, arranging the sections in pairs with their inner surfaces in contact, trimming their edges and then sewing.

5. The herein described method of making sausage casings, comprising first treating cured casings until rendered soft and pliable and substantially free from saline substances, cutting the casings longitudinally to form suitable sections, spreading each cut intestine separately to their full width and rolling until smooth, arranging the sections in pairs, one section above the other with their inner surfaces in contact and sewing the edges together.

In testimony whereof I affix my signature in presence of two witnesses.

PRESLEY E. COMEGYS.

Witnesses:
FRED WM. KAMBERG,
GEO. W. RUSSOW.

Copies of this patent may be obtained for five cents each, by addressing the "Commissioner of Patents, Washington, D. C."